United States Patent
Leslie et al.

(10) Patent No.: US 7,573,594 B2
(45) Date of Patent: Aug. 11, 2009

(54) METHODS AND SYSTEMS FOR DOCUMENT REPRODUCTION MANAGEMENT

(75) Inventors: Sara Lynn Leslie, Washougal, WA (US); Nathaniel Zachary Rutman, Portland, OR (US); Gary Lin Gaebel, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 706 days.

(21) Appl. No.: 10/857,229

(22) Filed: May 28, 2004

(65) Prior Publication Data

US 2005/0276520 A1 Dec. 15, 2005

(51) Int. Cl.
*H04N 1/40* (2006.01)

(52) U.S. Cl. ...................................... 358/1.15; 358/3.28

(58) Field of Classification Search ................ 358/3.28, 358/1.9, 1.15–1.16, 434, 436, 468
See application file for complete search history.

(56) References Cited

U.S. PATENT DOCUMENTS

| 4,210,346 | A | | 7/1980 | Mowry, Jr. et al. |
|---|---|---|---|---|
| 5,444,779 | A | * | 8/1995 | Daniele ...................... 399/366 |
| 5,841,978 | A | | 11/1998 | Rhoads |
| 6,089,765 | A | | 7/2000 | Mori |
| 6,119,186 | A | | 9/2000 | Watts |
| 6,311,214 | B1 | | 10/2001 | Rhoads |
| 6,324,573 | B1 | | 11/2001 | Rhoads |
| 6,327,623 | B2 | | 12/2001 | Watts |
| 6,499,665 | B1 | | 12/2002 | Meunier et al. |
| 6,529,288 | B1 | | 3/2003 | Miyazaki |
| 6,542,927 | B2 | | 4/2003 | Rhoads |
| 6,587,129 | B1 | | 7/2003 | Lavendel et al. |
| 2001/0003835 | A1 | | 6/2001 | Watts |
| 2001/0029513 | A1 | | 10/2001 | Kuwano et al. |
| 2002/0016816 | A1 | | 2/2002 | Rhoads |
| 2002/0038387 | A1 | | 3/2002 | Fuiks et al. |
| 2002/0075514 | A1 | | 6/2002 | Wright et al. |
| 2002/0130185 | A1 | | 9/2002 | LaForge et al. |
| 2002/0198791 | A1 | | 12/2002 | Perkowski |
| 2003/0026450 | A1 | | 2/2003 | Powell et al. |
| 2003/0040957 | A1 | | 2/2003 | Rodriguez et al. |
| 2003/0093384 | A1 | | 5/2003 | Durst et al. |
| 2003/0133167 | A1 | | 7/2003 | Enomoto |
| 2003/0138126 | A1 | | 7/2003 | Hashimoto |
| 2003/0139975 | A1 | | 7/2003 | Perkowski et al. |

FOREIGN PATENT DOCUMENTS

| EP | 0940970 B1 | 2/1999 |
|---|---|---|
| EP | 1054335 A2 | 5/2000 |
| EP | 1198122 A2 | 10/2001 |

* cited by examiner

*Primary Examiner*—Thomas D Lee
*Assistant Examiner*—Stephen M Brinich
(74) *Attorney, Agent, or Firm*—Shernoff, Vilhauer, McClung & Stenzel

(57) ABSTRACT

Embodiments of the present invention comprise methods and systems for associating a hard-copy document with computer-readable information and for accessing that information.

23 Claims, 4 Drawing Sheets

METHODS AND SYSTEMS FOR DOCUMENT REPRODUCTION MANAGEMENT

BACKGROUND OF THE INVENTION

Current document copying techniques require that a document be scanned on a copy machine. This is typically done by placing the document on a copier scanner directly or through a sheet feeder and scanning the document. This creates a digital image file of the face of the document. However, this image file also contains any deterioration, degradation and defects present on the scanned document. Paper discoloration, defects, fading, tears, rips and other degradation will show up in the scanned image file. Image degradation can also occur during scanning due to improper orientation on the scanner, poor exposure, poor contrast and other scanner-related problems. The result of these effects is a scanned image that does not have the same quality as the original document and much less quality than a user would prefer to receive or send to another recipient. In the copy process, this inferior image is then printed to a hard copy, which will contain all the defects and problems of the digital file. These quality problems can be overcome with the methods and systems of embodiments of the present invention. Current document scanning techniques share many of the problems of copying. However, typically a user scans a document for transmission as a digital file while copying creates a hard copy for physical delivery. When a document is scanned into a file for transmission over a network, a digital file is created. This file may contain many of the defects and problems described above in relation to the copy process. An inferior digital image file is created that does not accurately represent the quality of the original document. Furthermore, when a recipient receives a scanned image file, the file is typically in a format that is difficult to edit or modify (i.e., TIFF, JPG, PDF, etc.). These are generally compressed raster files, often in a proprietary format that requires special software for editing. These raster files, though compressed, are also often larger than the original document files (i.e., MS Word) so more resources and bandwidth are required for transmission of the document.

BRIEF SUMMARY OF THE INVENTION

Methods and Systems of embodiments of the present invention comprise techniques for attaching a correlation code to a hard-copy document, for identifying a document as it is being scanned and for accessing an original document file or another designated file for use in printing and/or transmitting the document.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

Embodiments of the present invention comprise methods and systems for correlating a hard copy document with one or more computer-readable files that represent the hardcopy document. The correlation may be done by placing a scan code on the hardcopy document. The code may be visible to the human eye or invisible. When the hard-copy document is scanned, the code is read and the scanning device is able to identify the document and access one or more files stored on a network accessible to the scanning device. Instead of scanning the hard-copy document completely, the scanning device may access one or more of the associated files and use them to create another hard copy of the hard-copy document or transmit one or more of the associated files to a recipient. In this manner document scanning problems and inferior scan and print results are avoided.

Figure 1:
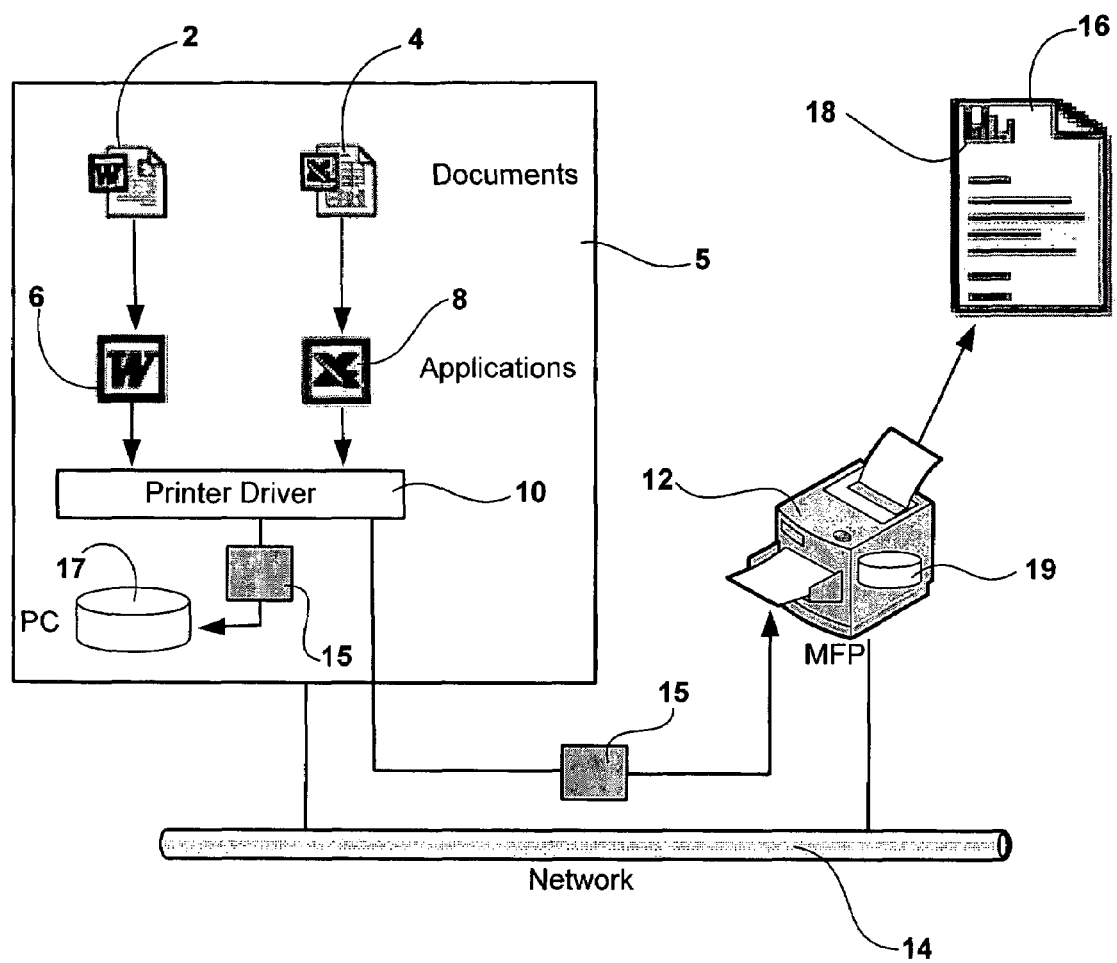
FIG. 1 is a diagram showing components of a system that associates correlation codes with hard-copy media.

Some embodiments of the present invention may be described in relation to FIG. 1. In these embodiments a document is typically generated using an application 6, 8. Applications may comprise many programs such as word processors, spreadsheets, databases, drafting programs, mathematics programs and many others. In some exemplary embodiments used for this description, a word processing document or a spreadsheet may be used. A system user may create a document, such as an MS Word file 2 or an MS Excel file 4 using these software applications 6, 8 or many other applications. When a user wants to print a file, the application 6, 8 that created the file is typically used and a print function is selected therein. This process generally invokes a print driver 10 and many other print system components which process the document file and create one or more print stream files including printer-readable files 15, which are sent to a printer 12 or stored 17 for future use. The printer 12 may be connected to the user's computing device 5 through a network 14, such as a local area network (LAN) using many known networking systems and methods. Network 14 may comprise wired and/or wireless connections as well as infrared, fiber-optic and other physical connections. In some embodiments, network 14 may simply comprise a single cable such as a serial cable, a parallel cable, a Universal Serial Bus (USB) cable or another connector. When the printer 12 receives the print file, a hard copy document 16 is created. In embodiments of the present invention, hard copy document 16 may comprise a correlation code 18. A correlation code 18 may comprise humanly-visible indicia such as text, barcode, patterns and other codes. A correlation code 18 may also comprise indicia that are not visible to the human eye such as codes marked in invisible inks, magnetic inks, magnetic codes or other invisible or non-humanly distinguishable indicia.

The primary purpose of correlation codes 18 is to correlate or associate the hard copy document 16 with one or more computer-readable files 2, 4, 15. In some embodiments, correlation codes may comprise a network address or file name for the document's original file. In other embodiments, other files may be associated with the hard copy document 16. For example, an intermediate print stream file 15 such as a Page Description Language (PDL) file, a raster file, a spool file or some other file created in the print process or some ancillary process of embodiments of the present invention. In some embodiments, a .pdf file, a tiff file, a JPEG file, a raw raster file or an enhanced raster file may be associated with a document. Generally, when an intermediate print stream file 15 is created using known methods, the file 15 is a temporary file that is erased some time during or after the print process completes.

In embodiments of the present invention, these intermediate print stream files 15 may be stored 17 indefinitely for later use.

A correlation code 18 may be automatically correlated when a document is printed. In these embodiments, the correlation code 18 may be assigned by a printer driver 10, which may associate the original document file 2, 4 that is being printed with the hard copy printer output 16. Some of these embodiments may automatically associate an intermediate print stream file 15 with the hard copy output 16. In other embodiments, multiple files may be associated with printer output 16. A user may also designate which file to correlate with a given print job or hard-copy document through a printer driver dialog box, through a user interface or by some other means.

In other embodiments, a correlation code may be associated with a file or group of files by a print controller that resides on the printing device. A print controller may automatically assign a correlation code when a document is printed. A print controller may also receive user input from a user interface on the print device.

In still other embodiments, a correlation code may be associated with a file or group of files when a driver sends a PJL command to the print stream. In these embodiments, the driver will determine what files to associate with the document, automatically or through user interaction and convert this information into a PJL command. This PJL command may then incorporate the correlation code into the document to be printed In some embodiments, a correlation code 18 may be generated independently of the document print process. In these embodiments, a correlation code 18 may be printed on a label or other non-document media that may be attached to a hard copy document 16. The files associated with the correlation code 18 may be designated manually by a user or through an automated process in a stand-alone application, in a custom printer driver, in an application or in some similar manner known in the art. Once the correlation code 18 is attached to the hard copy document 16, the code 18 may be accessed as if it were printed as part of the document 16.

Figure 2:
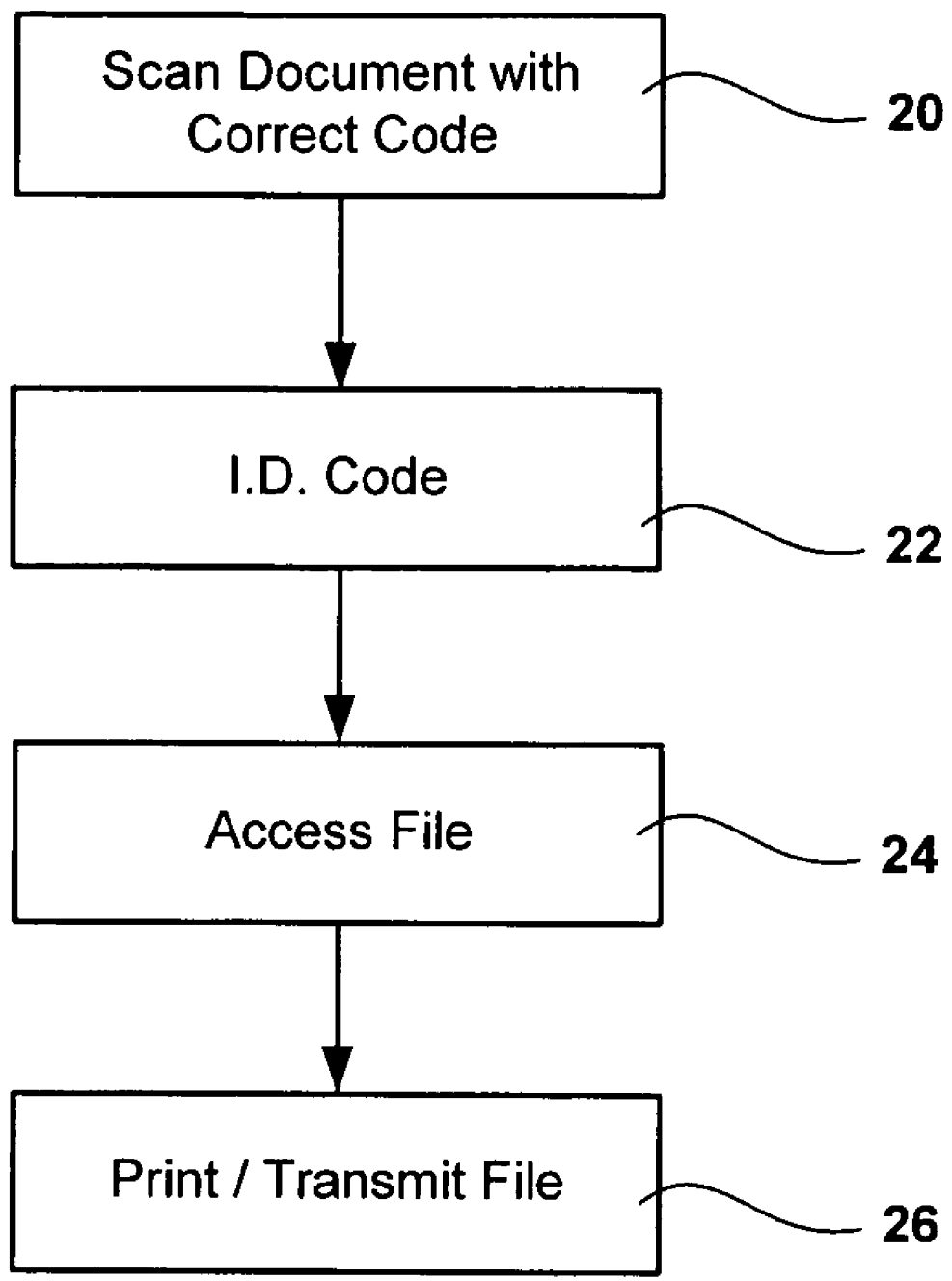
FIG. 2 is a flow chart showing steps of an embodiment of the present invention.

Once a hard copy document 16 is generated and a correlation code is generated, the files 2, 4, 15 associated with that document 16 may be accessed through the correlation code 18. The correlation code 18 may be accessed during a copy scan or other scan process. In some embodiments, described in relation to FIG. 2, a hard copy document 16 is scanned 20. The scanners used in embodiments of the present invention comprise methods and systems for reading a correlation code 18 and identifying 22 the files associated with that code 18. These files may then be accessed 24 and used for the current job. In some embodiments where the user intends to copy the document, the file will be printed 26 at the copier or multi-function peripheral (MFP) where the code is scanned. This may be performed in lieu of scanning the entire document. In embodiments where the user intends to scan and transmit the document, the copier or MFP may access the file 24 and transmit the file directly to a recipient. This process may obviate scanning and processing the majority of the document as the file can be sent directly without scanning any more than the correlation code 18.

Some embodiments of the present invention may be described with reference to FIG. 3. In these embodiments, a scan device 30, which may be an optical scanner, a magnetic scanner, a copier, an MFP or any other device capable of reading a code such as a correlation code 18 (FIG. 1). Scan device 30 may also comprise a storage device 32 such as a hard drive, CD-RW drive, flash memory or another storage device. In more typical embodiments, scan device 30 will be connected to a local area network (LAN) 34 which may allow access to other networks 36 such as Wide Area Networks (WANs), the internet and others. The network 34 may also provide connectivity to client computing devices 40, 50 which allow users to access the scan device 30 and other network components. The network 34 may also provide connectivity to a server 42 that provides storage for files on the network. The network may additionally comprise additional printing devices 38, which may be MFPs, copiers, printers or other devices. These additional printing devices 38 may also comprise scanners and/or storage devices.

Figure 3:
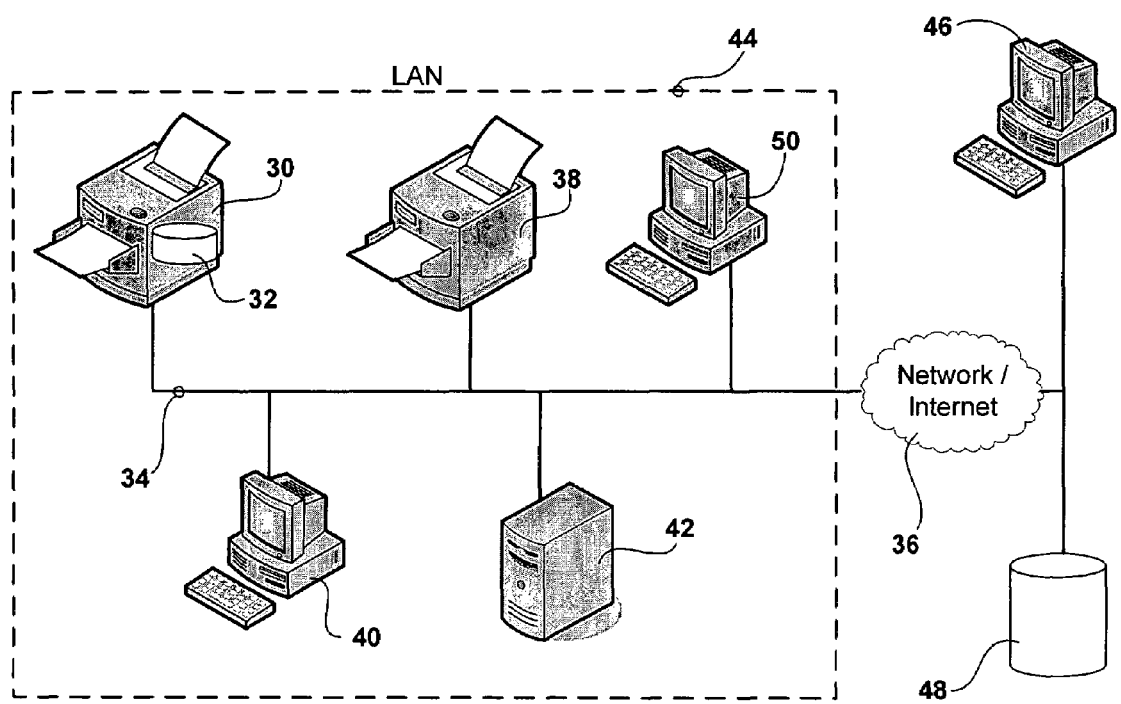
FIG. 3 is a diagram showing components of a system that is capable of associating and reading correlation codes as well as printing and transmitting files.

In an environment as shown in FIG. 3, several embodiments of the present invention may be used. In a first set of embodiments, scan device 30 may or may not have printing capabilities. In this set of embodiments, additional print device 38 may be used for printing functions. As in other embodiments, a user operating a client computing device 40 may create or access an application document file and select a print function. The print function may invoke a printer driver, print processor or other print stream component that enables file correlation and inserts a correlation code into a print file. The application document file is then printed on additional printing device 38 or on scan device 30 when it has this functionality. The application document file is printed with a correlation code or a correlation code is generated and attached to the hard copy document. The correlation code now associates the hard copy document with a file that is stored at a location that will be accessible to scan device 30. The file that is correlated with the document may be the original application file, a printer-readable file, an intermediate print stream file or some other file that accurately represents all or a part of the hard copy document. The correlated file may reside on the client computing device 40, on a storage device 32 associated with the scan device 30 (which may also be a printer), on another scan device or print device such as additional printing device 38, on a server 42 that is connected to the local network 44, on a remote storage device 48 connected to the network 44 through a SAN, WAN or the internet, or at some other location. Wherever the correlated file resides, the correlation code will contain the address or information necessary to obtain the file address.

When a user wishes to obtain an additional hard copy of the hard copy document or transmit a copy to a recipient, she may place the copy on scan device 30, which will recognize the correlation code and have access to the correlated file. In some embodiments, a user interface may be initiated by the scan of the correlation code. This user interface may prompt a user for preferences regarding transmission or printing options as well as file formats and other preferences. In some embodiments, user interface options will include the option of performing a "real" scan of the document. If the user selects a function that requires access to a correlated file, the scan device 30 may access the required file either on its internal storage device 32, on the client computer 40, on a local server 42, on a remote storage device 48 or at some other location. When the file is located, it may be sent to a local recipient 50, sent to a remote recipient 46, such as via e-mail, or the file may be printed at scan device 30 or additional printing device 38, which may be local or a remote device. In alternative embodiments, a user interface may not be present and functions may be performed automatically.

Figure 4:
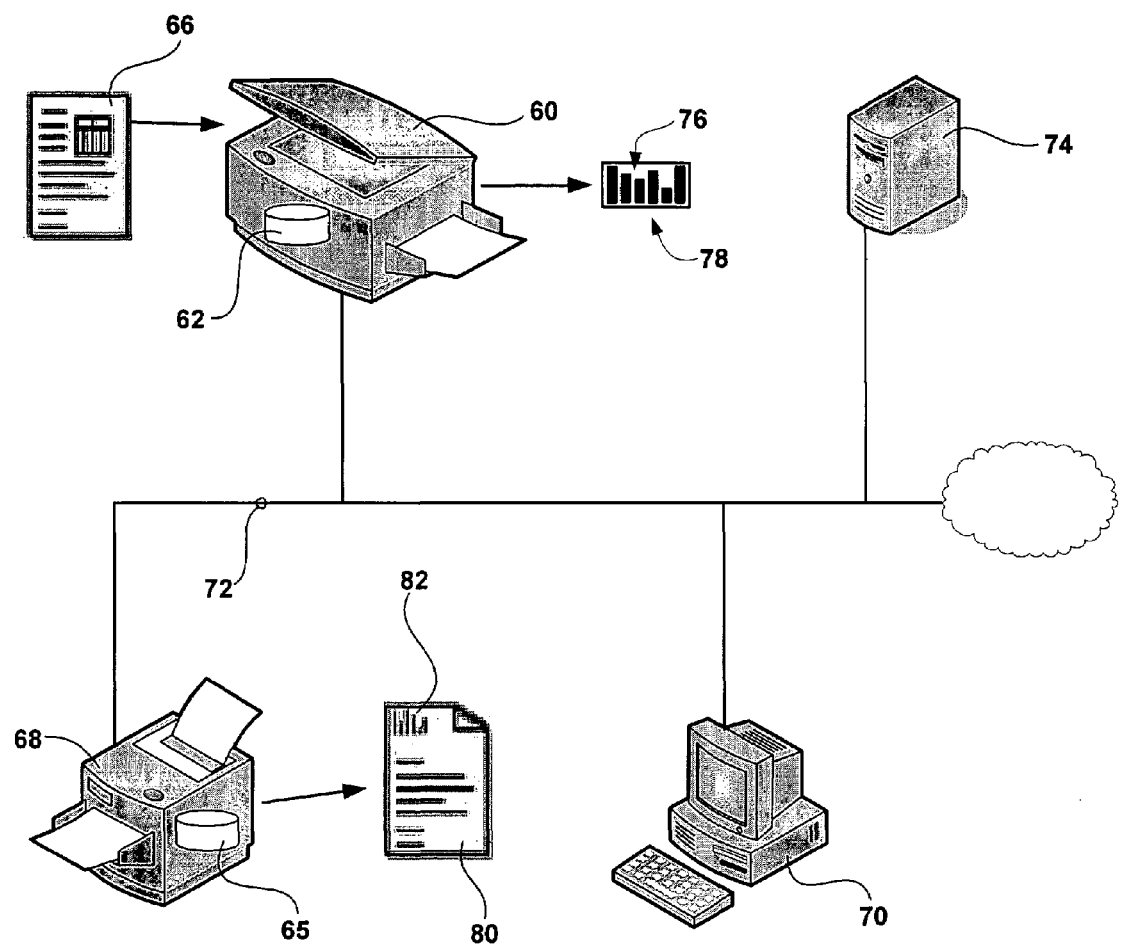
FIG. 4 is a diagram showing components of a system of embodiments of the present invention.

Some embodiments of the present invention may be used to accomplish a scan-to-hardcopy function. In these embodiments, explained with reference to FIG. 4, a hard-copy document 66 that has not yet been given a correlation code is placed on a scanner 60, which may also have printing, storage and other capabilities. In this scenario, an original application file may not be available to the user. Document 66 is then scanned on scanner 60 thereby creating one or more digital files of document 66. These digital files may be stored on scanner 60 on a storage device 62 thereon or may be stored elsewhere when the scanner 60 is attached to a network 72. In a network configuration, as shown in previously described embodiments, digital files may be stored on a server 74, a storage device on a client PC 70, a storage device 65 on a network printing device 68 or on some other device in communication with the scanner 60.

Once one or more digital files have been created, these files may be associated with the hard-copy document 66 or a copy of the hard-copy document 66. This can be performed in several ways. In some embodiments a scanner 60, when it has printing capabilities, or another printing device 68 may print a correlation code 76 on some media 78, such as an adhesive label, that can be affixed to the hard-copy document 66. Any number of known media options may be used. When the correlation code 76 media 78 has been attached to the hard-copy document 66, the code may then be scanned to provide access to the digital files created by the scanner 60. In some embodiments, a new code-enhanced copy 80 of the hard-copy document 66 may be printed along with an integrated correlation code 82, printed thereon by a printing device, such as printing device 68.

In these and other embodiments, the correlation code 76 or 82 may be generated automatically using default settings. The correlation codes 76 or 82 may also be generated with the benefit of user input. In some embodiments, a scanner, MFP or other device may comprise a front panel display or other user input device that will allow a user to input correlation code option choices and other data. This input device may be in the form of a keypad, touch-screen or some other device. In other embodiments, user input may be effectuated through a computing device that is connected to a scanner 60, such as a client PC 70 or some other device.

In some embodiments of the present invention, a correlated file may be stored in multiple locations. Some embodiments may automatically archive a correlated file on a remote server or some other location for file protection. Some embodiments may copy a file from a client computer to a storage device located on a printing device to alleviate future network traffic or for other reasons. In some embodiments, a user interface may allow a user to select from different file storage options to provide better performance, security or convenience.

In some embodiments of the present invention, application files and other associated files may be stored in a designated location on a printing or scanning device, on a client storage device, on a local server, on a remote server or at some other location. When this repository is filled to some point near its capacity, files may be managed by movement to an archive, deletion, compression or some other action. These actions may be performed on a first-in-first-out (FIFO) basis, on a least-accessed basis, on a largest documents first basis, on a document type priority basis or some other basis.

Documents stored in embodiments of the present invention may be stored in a compressed format and may be encrypted for security.

In embodiments that transfer files, files may be transferred by e-mail, file transfer protocol (FTP), hypertext transfer protocol (http), TWAIN or by some other method.

Along with files, some embodiments may store file information that may comprise: file location, file size, file creation, modification and access dates, a file expiration date, a file creator's ID, document priority data, encryption data, compression data or other information.

Files stored in conjunction with some embodiments may include PDL files, a display list, a printer-ready raster file or other files.

In some embodiments, correlation codes may be located only on the first page of a document. In other embodiments, correlation codes may be located on each page or section of a document. In still other embodiments, a global correlation code may be located at an accessible location such as the first or last page of a document and further subdivision correlation codes may be placed at other key locations to provide access to subdivisions of the entire document.

Correlation codes may be located at any position on a page and any location within a document. Correlation codes may also use various formats such as optical codes, steganographic codes, magnetic codes and others. Correlation codes may also use combinations of these and other formats. In some embodiments of the present invention, a scanning device may be a simple optical wand, a magnetic reader or another low-cost, simple code reader that is connected to a network 44. These simple readers may be connected through a computing device at some point in the network. Simple readers may be distributed throughout a network 44 to provide low-cost accessibility to document copy and transmit services. In this configuration, a user may bring a hard-copy document to any scanner location and, through the correlation code present on the document, copy or transmit the document electronically. The copy function may direct any printing device on the network 44, such as additional printing device 38 to print a document copy. The transmit functions may direct network devices to access the associated file(s) and transmit them to any location accessible to the network 44.

In some embodiments of the present invention, correlation codes may comprise additional information about document security and restrictions. Some embodiments of a correlation code may comprise a list of allowable document recipients. When scanned, the code may offer the user a choice of recipient to which the document may be sent. These codes may restrict document transmission to specific areas, groups or individuals. These codes may also be used for convenience to allow a user to easily select a recipient coded thereon.

In some embodiments, correlation codes may also record document history, such as distribution history or document ownership. Upon scanning a document correlation code, a user may be able to identify the owner of the document and/or a list of persons who have received the document or have permission to access the document.

Correlation code information may also comprise document origination data and/or version data to identify the originator of the document, the origination date, whether the document is a draft or final version and other information.

In some embodiments of the present invention, a correlation code may be used to track and identify the number of times a document has been transmitted, printed or copied. In some of these embodiments, a network device may be used to keep track of transmission, print and copy data. Each time a document is accessed, a counter may be incremented to keep track of the action. This access data may be encoded into the correlation code or may simply be accessed by scanning the correlation code. This information may be presented in the form of a history list. Access data may also be printed on the hard-copy document itself for a user to read from the document.

Further embodiments of the present invention may provide methods and systems for encoding hard-copy documents with a unique identifier. In these embodiments, a correlation code may comprise a unique code that specifically identifies the hard copy document. This unique identifier may be computer-readable, but unintelligible to a user or may be humanly readable.

Still other embodiments of the present invention may utilize correlation codes that comprise watermark management. These embodiments may identify watermarks in documents based on PDL codes or they may identify watermarks from a scanned image of the document. When PDL codes for watermarks are identified, they may be manipulated by the present invention to show changes or additional information. Watermarks identified from scanned image data may be filtered out and replaced by new marks.

In some embodiments a watermark may be replaced by a new watermark, which may designate a new document status. For example, a watermark containing the word "original" may be replaced by a watermark containing the word "copy." Watermarks may also be completely removed from a document. In some embodiments, watermarks may simply be repeated as in a simple copy operation. This may be used to preserve the quality of the mark that may be lost in a typical scan/print procedure used in most copy machines.

Embodiments of the present invention may enable copying or modifying of steganographically secure watermarks. While a typical copy machine would not be able to detect or insert this data, these embodiments may identify a steganographic mark through the correlation code. Once a steganographic mark is identified, these embodiments may reproduce the mark as it was in the original document or replace the mark with a new one containing a new steganographic mark that may contain unique data. In some of these embodiments, the steganographic code would not have to be decoded as sufficient information to identify the type of code would be present in the correlation code.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for storing a reproducible replica of a printed document, said method comprising the steps of:
   (a) receiving at least one page of a document in a first electronic format and converting said at least one page into a printable file in a non-editable second format;
   (b) storing said printable file in said non-editable second format at an automatically accessible location; and
   (c) printing said document and marking at least one page of the printed said document with an automatically-readable correlation code that correlates the printed said document with said printable file in said non-editable second format stored at said location.

2. The method of claim 1 wherein said stored reproducible replica is printed in lieu of a scanned hard copy of said document by the steps of:
   (a) scanning a portion of the printed said document including said correlation code;
   (b) based upon said correlation code, automatically retrieving a copy of said printable file stored in said non-editable second format; and
   (c) printing said copy.

3. The method of claim 2 including the step of marking said copy with a human-readable watermark indicating that said copy is not an original.

4. The method of claim 1 where said non-editable second format is an intermediate print stream file created in a print process.

5. The method of claim 4 where said intermediate print stream file is at least one of a spool file, a Page Description Language File, and a raster file.

6. The method of claim 1 including the step of marking at least one page of the printed said document with a human-readable watermark indicating that said document is an original print.

7. An apparatus capable of scanning and printing documents, said apparatus comprising:
   (a) a first system capable of automatically scanning at least one page of a printed document;
   (b) a second system that:
      (i) automatically retrieves a stored electronic file that replicates source original of said printed document if said step of scanning said at least one page of said printed document retrieves a correlation code correlating said printed document with said stored electronic file source original, where said file source original is printable and file in a non-editable format; and
      (ii) automatically prints said stored electronic file source original using said non-editable format, and causes said apparatus to not print the scanned said at least one page of said printed document;
   (c) a third system that:
      (i) converts said document to a printable file in a non-editable format if said step of scanning said at least one page of said printed document does not retrieve a correlation code correlating said printed document with a stored electronic file source original of said document;
      (ii) stores said printable file in said non-editable format at a location automatically accessible to said apparatus;
      (iii) prints said document and marks at least one page of the printed said document with an automatically-readable correlation code that correlates the printed said document with said printable file in said non-editable format stored at said location.

8. The apparatus of claim 7 where said non-editable format is an intermediate print stream file created in a print process.

9. The apparatus of claim 8 where said intermediate print stream file is at least one of a spool file, a Page Description Language File, and a raster file.

10. The apparatus of claim 7 where said third system marks at least one page of the printed said document with a human-readable watermark indicating that said document is an original print.

11. The apparatus of claim 7 where said second system marks at least one page of the printed said stored electronic source original with a human-readable watermark indicating that it is not an original.

12. The apparatus of claim 7 including the step of incrementing a counter indicating the number of times said stored electronic file source original in said non-editable format has been retrieved to print a copy.

13. A method comprising:
   (a) receiving at least one page of a multi-section document in a first electronic format and converting said at least one page of said multi-section document into a printable intermediate print stream file in a non-editable second format;
   (b) storing said printable intermediate print stream file at an automatically accessible location; and (c) printing said document and marking at least one page of the printed said document with an automatically-readable global correlation code that correlates the printed said document with said printable intermediate print stream file stored at said location, and marking a respective first page of at least one section of said document with a local correlation code that correlates said section of said document with an associated portion of said printable intermediate print stream file.

14. The method of claim 13 where said intermediate print stream file is created in a print process.

15. The method of claim 14 where said intermediate print stream file is at least one of a spool file, a Page Description Language File, and a raster file.

16. The method of claim 13 including the step of marking at least one page of the printed said document with a human-readable watermark indicating that said document is an original print.

17. The method of claim 16 including the steps of:
(a) scanning a portion of the printed said document including said global correlation code;
(b) based upon said global correlation code, automatically retrieving a copy of said printable intermediate print stream file;
(c) marking said copy with a human-readable watermark indicating that said copy is not an original; and
(d) printing said copy.

18. The method of claim 17 including the step of incrementing a counter indicating the number of times said printable intermediate print stream file has been retrieved to print a copy.

19. The method of claim 13 including the steps of:
(a) scanning a first portion of the printed said document including said global correlation code and a second portion of said document including at least one said local correlation code;
(b) based upon said global correlation code, automatically retrieving a copy of said printable intermediate print stream file; and
(c) based upon the retrieved said at least one local correlation code, printing only the sections of said document corresponding to said at least one local correlation code.

20. An apparatus capable of scanning and printing documents, said apparatus comprising:
(a) a first system capable of automatically scanning at least one page of a printed document;
(b) a second system that:
(i) automatically retrieves a stored electronic file representing said printed document if said step of scanning said at least one page of said printed document retrieves a correlation code correlating said printed document with said stored electronic file, where said stored electronic file is in an image format; and
(ii) automatically prints said stored electronic file, and causes said apparatus to not print the scanned said at least one page of said printed document;
(c) a third system that:
(i) converts said document to a printable file in an image format if said step of scanning said at least one page of said printed document does not retrieve a correlation code correlating said printed document with a stored electronic file representing said document;
(ii) stores said printable file at a location automatically accessible to said apparatus;
(iii) prints said document and marks at least one page of the printed said document with an automatically-readable correlation code that correlates the printed said document with said printable file stored at said location.

21. The apparatus of claim 20 where said image format is at least one of a pdf format, a tiff format, and a jpeg format.

22. A method comprising:
(a) receiving at least one page of a multi-section document and converting said at least one page of said multi-section document into a file in an image format;
(b) storing said file at an automatically accessible location; and
(c) printing said document and marking at least one page of the printed said document with an automatically-readable global correlation code that correlates the printed said document with said file stored at said location, and marking a respective first page of at least one section of said document with a local correlation code that correlates said section of said document with an associated portion of said file stored at said location.

23. The method of claim 22 where said image format is at least one of a pdf format, a tiff format, and a jpeg format.

* * * * *